Figure 1:
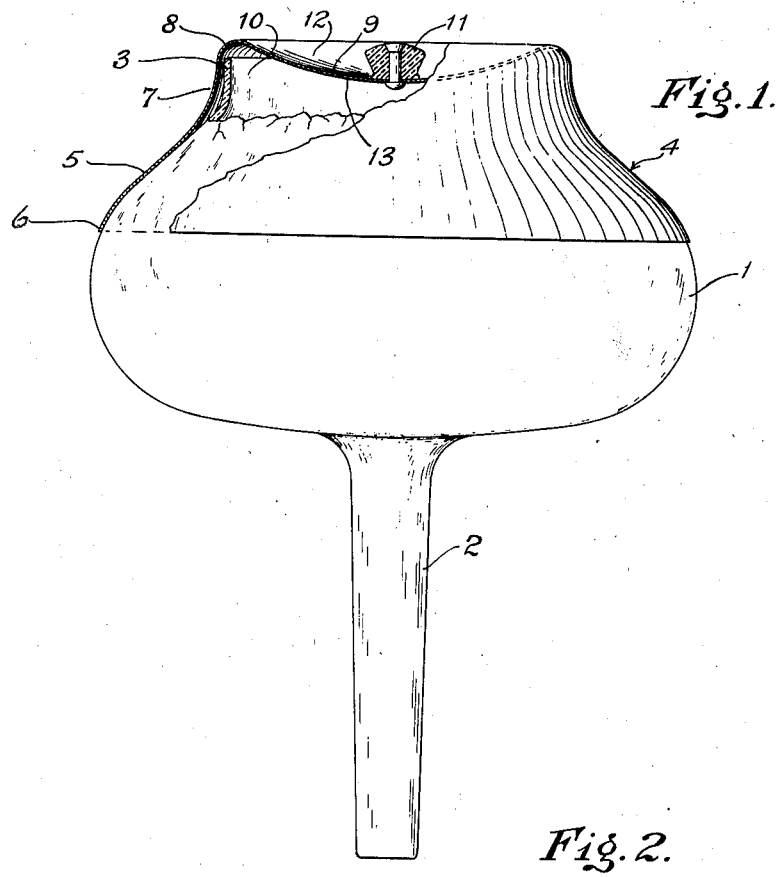

Oct. 16, 1934.    F. E. WOLCOTT    1,977,366
COFFEE MAKER
Filed Jan. 26, 1932

INVENTOR
FRANK E. WOLCOTT
BY
ATTORNEY.

Patented Oct. 16, 1934

1,977,366

UNITED STATES PATENT OFFICE 1,977,366

COFFEE MAKER

Frank E. Wolcott, West Hartford, Conn., assignor to The Silex Company, a corporation of Connecticut Application January 26, 1932, Serial No. 588,941

6 Claims. (Cl. 53—3)

My invention relates to coffee makers.

It has among its objects to provide an improved upper bowl assembly for coffee makers, and more particularly such coffee makers utilizing a glass upper bowl, whereby the latter may be protected over a substantial part of the bowl area, and the temperature of the bowl cover kept down in an improved manner, at the same time that a simple, inexpensive and attractive construction is made possible. A further object of my invention is to provide an improved bowl cover for the upper bowl of a coffee maker having an improved bowl shielding portion adapted to extend down over the body of the bowl and shield the same, and also improved means for enabling the upper portion of the cover to be spaced from the bowl in such manner as to avoid such objectionable overheating of the cover as to interfere with the use of the same. These and other objects and advantages of my improved construction will, however, hereinafter more fully appear.

In the accompanying drawing, I have shown for purposes of illustration, one embodiment which my invention may assume in practice.

In the drawing,—

Figure 2:
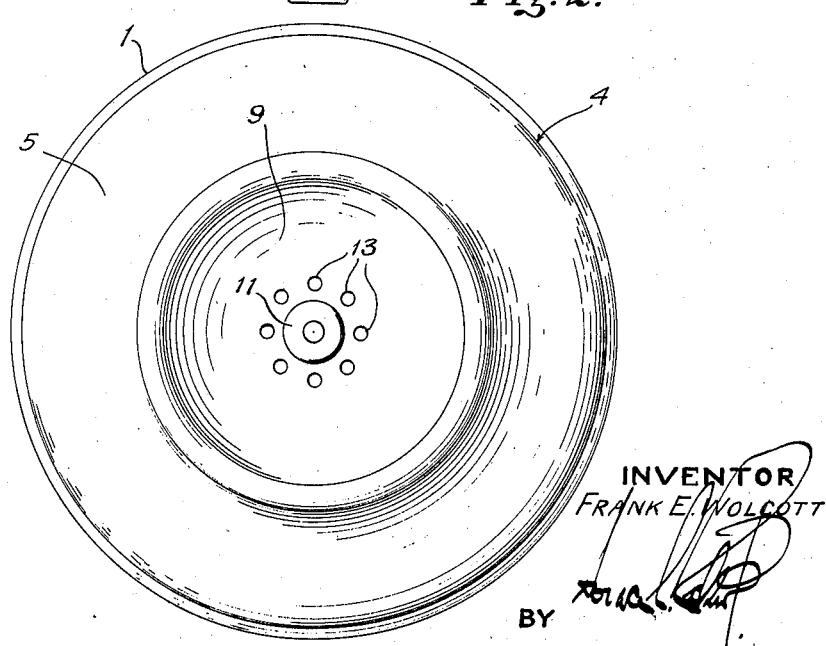

Figure 1 is a side elevation of this embodiment of my invention, a portion of the cover being broken away to facilitate illustration, and Fig. 2 is a plan view of the construction shown in Figure 1.

In this illustrative construction, it will be noted that I have shown an upper bowl having a curved and expanded body portion 1 between its lower stem 2 and its upper open end or neck 3, and also having mounted upon the same my improved bowl cover, generally indicated at 4.

This bowl cover 4, in my improved construction, is provided with an elongated depending portion 5 which extends down from the top over the curved portion 1 of the bowl and forms an effective shield therefor. While the length of this portion 5 may be varied when used with different forms of bowl, it will be noted that herein it extends down substantially below the open end or neck 3 of the bowl and substantially to the point of maximum width of the bowl body, in such manner as to provide an effective shield for the latter while so exposing a portion of the glass bowl as to permit the coffee making operation to be observed through the latter. Herein, it will also be noted that this shield portion 5 has its lower edge or rim 6 so turned inward as to make the same conform substantially to the shape of the bowl and fit the latter relatively closely. Thus, there being no marked difference in diameter, the shield portion 5 forms, in effect, a continuation of the lines of the bowl below the same. Attention is also directed to the fact that above the portion 5, the member 4 is provided with a portion 7 which slopes upwardly and laterally away from the open end portion or neck 3 of the bowl in such manner as to be spaced therefrom, the spacing herein extending from a point spaced below the base of the open end or neck 3 throughout the length of the latter. It will also be noted that this portion 7 extends substantially above the upper end of the neck 3 in spaced relation to the latter, and is then curved inward as shown at 8 and provided with an integral cover portion 9 overlying the opening 10 in the neck 3. In the preferred construction illustrated, this cover portion 9 is also made concave. i. e. downwardly curved or dished below the portion 8, in such manner that the handle 11 thereon, herein in the form of an insulating knob, is disposed within a depressed portion 12 in the top of the cover in such manner that its upper end does not extend above the rim provided by the portion 8. Attention is also directed to the fact that the cover 9 is provided with suitable aperture means 13 adapted to permit the escape of vapor from the bowl and consequently to prevent the building up of pressure under the cover, and also to permit the air in the upper bowl to escape so as to admit liquid freely from below to the upper bowl, and subsequently to permit air to reenter the upper bowl and allow the liquid therein to return to the lower bowl, these apertures, which obviously may be disposed in various arrangements, herein being disposed radially around the handle knob 11.

In the use of my improved construction, it will be evident that whenever the bowl is in use during the coffee making operation, it will be not only covered by the portion 9, but have its top effectually shielded by the portion 5. Moreover, it will be noted that, due to the spacing of the portions 7 and 8 from the bowl neck 3 and the air space which is provided around the latter, the heat supplied by conduction from the bowl to the portion 9 is minimized in such manner as, with the apertures 13, to prevent objectionable heating of the portion 9 or knob 11. Further, it will be noted that, due to the portion 5 and the fitting of the bowl therein, the member 4 provides an exceedingly stable support for the bowl when the latter is removed from the coffee maker and inverted on the member 4, as when the coffee making operation has been completed. Attention is further directed to the fact that, due to my improved spacing of the portions 7 and 8 from the neck 3, the temperature of the rim portion 8 is kept down in such manner as to reduce the temperature of this portion which rests on the table and acts as a support for the bowl when the same is in the inverted position described. In this connection, it will be noted that during the latter part of the coffee making operation when the liquid in the upper bowl is slowly returning to the lower bowl, an equal volume of cool air enters the upper bowl through the apertures 13 which materially lowers the temperature of the cover 9 as well as the handle 11, and that these parts being out of contact with the hot bowl are maintained considerably cooler than the bowl. Thus the cover and particularly the handle are maintained at a temperature which permits the removal of the cover without discomfort, as for example when it is desired to grasp it when removing the upper bowl. These and other advantages of my improved construction will, however, be clearly apparent to those skilled in the art.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:—

1. The combination of a coffee maker upper bowl having an open top, a cover for said open top having a depending bowl-shielding and cover-supporting skirt, said skirt having a bowl engaging portion contacting said bowl below the top thereof and supporting said cover out of contact with said bowl.

2. In combination, a coffee maker upper bowl having a curved enlargement between its ends and an open top neck, and a cover supported on said enlargement out of contact with said neck having a depending cover-supporting and bowl-shielding portion enclosing said enlargement below said neck and its lower edge merging substantially into the lines of said enlargement, said cover being provided with air inlet and outlet means permitting the circulation of air therethrough.

3. The combination of a coffee maker upper bowl having an upstanding neck open at the top, a cover for said open top having a depending bowl-shielding and cover-supporting skirt, said skirt having a bowl engaging band contacting said bowl below said neck and supporting said cover vertically and laterally spaced from said neck.

4. In combination, a coffee maker upper bowl having an open neck, and a cover having a portion supporting the same on said bowl below the upper extremity of said neck and a body portion above said supporting portion spaced from said neck at the outside of the latter and above the upper edge thereof, said cover being provided with air inlet and outlet means permitting the circulation of air therethrough.

5. In combination, a coffee maker bowl having an open neck and a curved enlargement between its ends, and a cover supported on said enlargement and having a depending shield portion overlying the upper portion of said curved enlargement while exposing the lower portion of the bowl, and also having an upper portion spaced from said neck and carrying a handle member, said cover being provided with air inlet and outlet means adjacent the handle permitting circulation of air through the cover and about the handle.

6. The combination of a coffee maker upper bowl having an upstanding annular neck open at the top, a cover for said open top having a depending annular bowl-shielding and cover-supporting skirt, said skirt having an annular bowl engaging band contacting said bowl below said neck and supporting said cover in vertically and laterally spaced relation with said neck, and handle means carried by said cover remote from the bowl engaging band of said skirt, said cover being provided with air inlet and outlet means adjacent the handle to permit circulation of air through the cover and about the handle.

FRANK E. WOLCOTT.